US011472995B2

(12) United States Patent
Ramasamy et al.

(10) Patent No.: US 11,472,995 B2
(45) Date of Patent: Oct. 18, 2022

(54) ENVIRONMENTALLY-FRIENDLY LUBRICANT FOR OIL FIELD DRILLING FLUID APPLICATIONS

(71) Applicant: Saudi Arabian Oil Company, Dhahran (SA)

(72) Inventors: Jothibasu Ramasamy, Dhahran (SA); Md Amanullah, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 111 days.

(21) Appl. No.: 16/037,593

(22) Filed: Jul. 17, 2018

(65) Prior Publication Data

US 2020/0024500 A1    Jan. 23, 2020

(51) Int. Cl.
*C09K 8/035* (2006.01)
*C09K 8/20* (2006.01)
*E21B 21/00* (2006.01)

(52) U.S. Cl.
CPC .............. *C09K 8/206* (2013.01); *C09K 8/035* (2013.01); *E21B 21/00* (2013.01); *C09K 2208/34* (2013.01)

(58) Field of Classification Search
CPC .... C09K 2208/34; C09K 8/035; C09K 8/206; C09K 8/22; E21B 21/00
See application file for complete search history.

(56) References Cited

U.S. PATENT DOCUMENTS

| | | | | |
|---|---|---|---|---|
| 2,383,632 | A * | 8/1945 | Trent | C11C 3/04 554/167 |
| 3,048,538 | A * | 8/1962 | Rosenberg | C09K 8/22 507/116 |
| 4,371,470 | A * | 2/1983 | Matsukura | C07C 67/03 554/167 |
| 4,802,998 | A | 2/1989 | Mueller et al. | |
| 5,888,947 | A | 3/1999 | Lambert et al. | |
| 8,563,482 | B2 | 10/2013 | Amanullah | |
| 8,846,583 | B2 | 9/2014 | Espange et al. | |
| 9,546,342 | B1 * | 1/2017 | Sutterlin | B01D 11/04 |
| 9,598,625 | B2 | 3/2017 | Massey et al. | |
| 2009/0293665 | A1 * | 12/2009 | Brouwer | B60R 1/02 74/490.13 |
| 2013/0236520 | A1 * | 9/2013 | Popovsky | A61K 8/37 424/401 |
| 2015/0144403 | A1 * | 5/2015 | Forest | C09K 8/64 175/65 |
| 2015/0166866 | A1 | 6/2015 | Dobson, Jr. et al. | |
| 2015/0322325 | A1 | 11/2015 | Amanullah et al. | |
| 2017/0137689 | A1 | 5/2017 | Deroo | |

FOREIGN PATENT DOCUMENTS

| | | |
|---|---|---|
| CN | 102311722 A | 1/2012 |
| CN | 104371674 A | 2/2015 |
| WO | 2008006065 A1 | 1/2008 |
| WO | 2013078374 A1 | 5/2013 |
| WO | 2015085306 A1 | 6/2015 |
| WO | 2015171700 A1 | 11/2015 |
| WO | 2016183140 A1 | 11/2016 |
| WO | 2017176244 A1 | 10/2017 |

OTHER PUBLICATIONS

Office Action dated Sep. 24, 2020 pertaining to U.S. Appl. No. 16/037,569, filed Jul. 17, 2018, 16 pgs.
International Search Report and Written Opinion dated Feb. 21, 2019 pertaining to International application No. PCT/US2018/050858 filed Sep. 13, 2018, 13 pgs.
International Search Report and Written Opinion dated Mar. 8, 2019 pertaining to International application No. PCT/US2018/050860 filed Sep. 13, 2018, 34 pgs.
First Examination Report pertaining to Patent Application No. GC2018/36119, 4 pages, dated Feb. 12, 2020.
First Examination Report pertaining to Patent Application No. GC2018/36118, dated Feb. 11, 2020.
Miswaco, et al., ROP-Enhancing Primary Lubricant, www.miswaco.com/HydraGlyde, 1 page.
Karmakar et al., "Chemically Modifying Vegetable Oils to Prepare", Lubricants, 5, 44, pp. 2-17, Nov. 7, 2017.
Lam et al., "Homogeneous, heterogeneous and enzymatic catalysis for transeterification of high free fally acid oil (waste cooking oil) to biodiesel: A review", Biotechnology Advances 28, pp. 500-518, Mar. 31, 2010.
Magee et al, Composition of American Distilled Tall Oils, JAOCS, vol. 64, 4, pp. 321-324, 1992 (Year: 1992).
Office Action dated Apr. 7, 2020 pertaining to U.S. Appl. No. 16/037,569, filed Jul. 17, 2018, 18 pgs.
U.S. Notice of Allowance and Fee(s) Due dated Jul. 21, 2021 pertaining to U.S. Appl. No. 16/037,569, filed Jul. 17, 2018, 18 pages.

\* cited by examiner

Primary Examiner — Alicia Bland
(74) Attorney, Agent, or Firm — Dinsmore & Shohl LLP

(57) ABSTRACT

The present application discloses water-based drilling fluid system compositions and methods for making water-based drilling fluids systems. According to one embodiment, a drilling fluid system may include a drilling fluid and a lubricant. The lubricant may be synthesized from plant-based raw material oil.

19 Claims, No Drawings

ENVIRONMENTALLY-FRIENDLY LUBRICANT FOR OIL FIELD DRILLING FLUID APPLICATIONS

TECHNICAL FIELD

Embodiments of the present disclosure generally relate to materials and methods utilized in natural resource wells and, more specifically, to water-based drilling fluids for use in drilling operations.

BACKGROUND

Drilling operations, for example, drilling a new wellbore for hydrocarbon extraction, include the common practice of continuously circulating a drilling fluid (alternatively known as a drilling mud) through the wellbore during the operation. The drilling fluid is pumped into the drill pipe to the bottom of the borehole, where the drilling fluid then flows upwardly through an annular space between the wellbore wall and the drill pipe and finally returns to the surface and flows out of the wellbore, where it is recovered for secondary processing. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore.

SUMMARY

Drilling fluids are used in various drilling applications, such as rotary drilling and coiled tubing drilling applications, to complete functional tasks and ensure that the drilling operation is safe, trouble-free, and economical. One objective of a drilling fluid is the reduction of friction between the drill string and the casing or the borehole wall by acting as a lubricating medium between the metal-metal interface and the metal-mudcake interface while drilling.

Conventional water-based drilling fluids, or "muds," have poor lubricating properties and thus have much greater coefficient of friction (COF) compared to oil-based drilling fluid systems. This is one of the major technical limitations of water-based drilling fluid systems compared to oil-based drilling fluid systems.

Different types of lubricating additives are added in water-based drilling fluid systems to reduce the COF and mitigate the torque and drag problems. Water-based drilling fluid systems may be used in either horizontal or extended-reach wells. A horizontal well has an inclination angle of generally greater than 85° from true vertical. A horizontal well is drilled to enhance reservoir performance by placing a long wellbore section within the reservoir. An extended-reach well is one in which the ratio of the measured depth versus the true vertical depth is at least 2:1.

In case of horizontal- and extended-reach wells, a greater COF can cause a reduction in drilling efficiency, an increase in equipment wear and pipe twist-off, a reduction in the rate of penetration, and an increase in the torque and drag, which can lead to various other drilling problems. A greater COF can also limit the reach of horizontal and extended-reach wells, which could be a barrier for extended-reach drilling operations. Therefore, drilling fluids with lesser COF values are desirable for horizontal and extended reach drilling operations.

To minimize the frictional resistance or COF values of water-based drilling fluids, lubricating additives are incorporated in the drilling fluid systems. However, many of these materials have limitations in their applications. Some of the conventional lubricants have limited capacity to reduce the COF of drilling fluid to enhance the fluid performance. Some of the lubricating materials have poor thermal and chemical stability. Some of these conventional lubricating materials are toxic and poorly biodegradable. Therefore, these materials have restricted applications for ecologically sensitive environments.

As such, there are ongoing needs for water-based drilling fluid systems that include environmentally-friendly lubricating additives that reduce the COF of the drilling fluid. Embodiments of the present disclosure include water-based drilling fluid systems that include a synthesized lubricant, which includes free fatty acids. The disclosed water-based drilling fluid systems with the synthesized lubricant have improved lubrication properties and environmentally-friendly qualities when compared to water-based drilling fluids without lubricants and water-based drilling fluid systems using conventional lubricants.

According to one or more embodiments, a method of producing a synthesized lubricant for water-based drilling fluid systems is disclosed. The method includes contacting a plant-based raw material oil with a base, which produces a mixture comprising free fatty acids and glycerol. Also, the method includes treating the mixture with a brine, which isolates the glycerol. Furthermore, the method includes removing the glycerol, which produces a synthesized lubricant comprising free fatty acids.

According to one or more embodiments, a method of producing a homogeneous water-based drilling fluid system is disclosed, which includes deriving free fatty acids from a plant-based raw material oil by treating the plant-based raw material oil with a base to produce a synthesized lubricant comprising free fatty acids. Moreover, the method includes combining the synthesized lubricant with a base drilling fluid to produce a water-based drilling fluid system.

Furthermore, according to one or more embodiments, a method for drilling a wellbore, is disclosed. The method includes delivering a homogeneous water-based drilling fluid system to the wellbore. The water-based drilling fluid system includes a synthesized lubricant and a base drilling fluid. The synthesized lubricant was synthesized by deriving free fatty acids from a plant-based raw material oil and treating the plant-based raw material oil with sodium hydroxide.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will fully convey the scope of the subject matter to those skilled in the art.

As stated previously, conventional lubricants may be used to reduce the COF of materials such as drilling fluids to enhance the fluid's performance. However, conventional lubricating materials are poorly biodegradable, not environmentally-friendly, and sometimes toxic. Therefore, conventional lubricants typically have restricted applications for ecologically sensitive environments.

Reference will now be made in detail to embodiments of synthesized lubricants. Embodiments of the synthesized lubricants include plant-based free fatty acids, which may be derived from a plant-based raw material oil. A plant-based fatty acid means a non-esterified free fatty acid that is derived from a plant-based raw material oil and is not in glycerol ester (glyceride) form. Types of free fatty acids that may be produced through the disclosed methods may include saturated free fatty acids, mono-unsaturated free fatty acids, and polyunsaturated free fatty acids. A saturated fatty acid may include palmitic acid ($C_{16}$). The saturated fatty acid may also include stearic acid ($C_{18}$) and arachidic acid ($C_{20}$). A mono-unsaturated fatty acid may include oleic acid ($C_{18}$). A polyunsaturated fatty acid may include linoleic acid ($C_{18}$).

Plant-based raw material oils include vegetable oil. Vegetable oil is a triglyceride extracted from a plant and seeds. Triglyceride is an ester of glycerol and three free fatty acids. Depending on the source of plants or seeds used to produce the vegetable oil, a vegetable oil may contain a mixture of different types of free fatty acids such as saturated, mono unsaturated, poly unsaturated, omega 3, omega 6 or omega 9 free fatty acids. Vegetable oils are commonly used in food preparation. Commonly used vegetable oils that may be used in food preparation include, but are not limited to, olive oil, palm oil, sunflower oil, corn oil and peanut oil. A vegetable oil may be "fresh" or "waste." Fresh vegetable oils, which may also be referred to as "pure vegetable oils," have not been processed or used in food preparation. Waste vegetable oils, which may also be referred to as "used" vegetable oils, include fresh vegetable oils that have been processed in some way or used in food preparation. Sometimes, waste vegetable oils may also be referred to as "recycled" vegetable oil when the waste vegetable oil is then further processed or used in some way.

Free fatty acids may be derived from vegetable oils, and such free fatty acids derived from vegetable oils have various applications. Such applications include emulsifiers and lubricants, including the presently disclosed, synthesized lubricants. However, the use of fresh vegetable oil as a raw material oil to derive free fatty acids may be expensive. Additionally, there may be a limited supply of fresh vegetable oils. Moreover, using fresh vegetable oil for the production of free fatty acids may create an unsustainable demand for vegetable oils in the market. As such, embodiments of the presently disclosed, synthesized lubricants may include free fatty acids derived from waste vegetable oil.

Waste vegetable oils may be used as a sustainable plant-based raw material oil for applications requiring vegetable oil. Waste vegetable oils may be used as emulsifiers and lubricants. In some embodiments of the present disclosure, waste vegetable oil is used as a plant-based raw material oil to derive the free fatty acids comprised in synthesized lubricants. Therefore, free fatty acids derived from waste vegetable oils may be used to produce synthesized lubricants for use in water-based drilling fluid systems. When used in this way, the water-based drilling fluid system that includes the synthesized lubricant may have a reduced COF when compared to conventional water-based drilling fluid systems. At the same time, the water-based drilling fluid system that includes the synthesized lubricant may also be environmentally-friendly.

Reference will now be made, in detail, to embodiments of producing synthesized lubricants that include plant-based free fatty acids.

Embodiments of producing a synthesized lubricant include contacting a plant-based raw material oil with a base to react the triglycerides of the plant-based raw material oil and produce a mixture of free fatty acids and glycerol. In some embodiments, the plant-based raw material oil may be a vegetable oil. In further embodiments, the plant-based raw material oil may specifically be a waste vegetable oil. The base may include sodium hydroxide (NaOH), potassium hydroxide (KOH), a sodium alkoxide, a potassium alkoxide, or combinations thereof. In further embodiments, the base may have a concentration of 10 wt. % based on the total weight of the solution. In other embodiments the base may be from about 5 wt. % to about 20 wt. %, from about 5 wt. % to about 15 wt. %, from about 8 wt. % to about 20 wt. %, from about 8 wt. % to about 15 wt. %, from about 9 wt. % to about 11 wt. %.

A quantity of base required to process the plant-based raw material oil may be determined by a titration method. In a typical titration method, plant-based raw material oil may be mixed with a basic solution and an indicator fluid. In some embodiments, the basic solution may be isopropyl alcohol of 99.2% purity by volume. An indicator fluid may be phenolphthalein or any other known indicator fluid typically used in titration methods. The indicator fluid may be added dropwise into the mixture of plant-based raw material oil and the basic solution until a color change is observed. The mixture may then be stirred to check the permanency of the pink color. In some embodiments, the titration method may be verified by repeating the titration method multiple times to calculate the average amount of base required to process the plant-based raw material oil. In some embodiments, the amount of base required to process 1 liter (L) of plant-based raw material oil may be from about 4.0 grams (g) to about 4.5 g. In other embodiments, the amount of base required may be from about 4.0 g to about 4.4 g, from about 4.0 g to about 4.3 g, from about 4.0 g to about 4.25 g, from about 4.1 g to about 4.5 g, from about 4.1 g to about 4.4 g, from about 4.1 to about 4.3 g, or from about 4.1 to about 4.25 g to process 1 L of plant-based raw material oil.

The method of contacting the plant-based raw material oil with the base may include adding the plant-based raw material oil and the base to a container. In some embodiments, the base can be added to the container after the plant-based raw material oil has been added. In some embodiments, the method may further include stirring the container containing the plant-based raw material oil and the base. In further embodiments, the container containing the plant-based raw material oil may already be stirring prior to adding the base. In even further embodiments, the method may include heating the container containing the plant-based raw material oil and the base.

In further embodiments where the container is heated, the container may be heated at a temperature from about 50° C. to about 75° C. In other embodiments, the temperature may be from about 55° C. to about 75° C., from about 60° C. to about 75° C., from about 65° C. to about 75° C., from about 70° C. to about 75° C., from about 50° C. to about 70° C., or from about 55° C. to about 65° C.

Additionally, the method may include contacting the plant-based raw material oil with the base for a period of from about 4 hours to about 8 hours. In other embodiments, the period may be from about 5 hours to about 8 hours, from about 6 hours to about 8 hours, from about 7 hours to about 8 hours, from about 4 hours to about 7 hours, from about 4 hours to about 6 hours, from about 4 hours to about 5 hours, from about 4 hours to about 6 hours, or from about 6 hours to about 8 hours.

As stated previously, the types of free fatty acids produced through the reaction of the plant-based raw material oil with the base produces a mixture of free fatty acids and glycerol. Also as stated previously, the free fatty acids may include saturated free fatty acids, mono-unsaturated free fatty acids, and polyunsaturated free fatty acids. The process of reacting or cleaving the triglyceride to make its corresponding fatty acid and glycerol is not hindered or affected by the degree of unsaturation, the type of fatty acid, or the fatty acid chain length. Additionally, neither the base nor any reaction medium water should interfere with other functional groups that may be present in the fatty acid. Therefore, irrespective of the type and ratio of plant-based raw material oil in the mixture, substantially all of the triglyceride present in the mixture will be converted to the corresponding free fatty acids and glycerol.

Additionally, during the process of converting the triglycerides of the plant-based raw material oil to fatty acid and glycerol, a reaction mixture comprising a light brown, semi solid and a brown liquid results. The light-brown semi solids are a sodium salt, which results from excess sodium hydroxide. The total reaction product may then be allowed to stay in static conditions for a period of time to complete the sedimentation of the solids at the bottom of the container. The period of time may be overnight or for 16 hours. The solids are then separated from the liquids and collected for subsequent treatment.

Embodiments of producing a synthesized lubricant also include treating the mixture with a brine to isolate the glycerol. "Brine" means water that is saturated or strongly impregnated with a salt. The salt may include sodium chloride or calcium chloride. To perform this treatment step, the solids may be rinsed with the brine. Washing the solids with the brine helps to remove any glycerol that may be present with the solids.

In some embodiments, the collected solids, which have been separated from the glycerol, are then suspended in water. In some embodiments, it may be necessary to adjust the pH of the suspension so that the pH is between about 4 to about 5. In some embodiments, adjusting the pH of the suspension includes adding an acid to the solids. In further embodiments, the acid may be added dropwise. The acid may include any strong acid. A strong acid may be HCl. Adding the acid to the solids allows the sodium salts of free fatty acids to convert back to free fatty acids. Once the free fatty acids are converted back into free fatty acids, they may be separated as an oily layer in the top of the water phase. The oily phase, which may be separated from water and collected as a brown liquid, is the synthesized lubricant.

Some embodiments of producing a synthesized lubricant may also include a first filtration step prior to contacting the plant-based raw material oil and the base. In some embodiments where the plant-based raw material oil is a waste vegetable oil, the plant-based raw material oil may be filtered to remove impurities present in the waste vegetable oil. As stated previously, the waste vegetable oil may include vegetable oils that have been used in food preparation; therefore, the waste vegetable oil may include impurities. Such impurities may include burnt and unburned food residue. In some embodiments, the waste vegetable oils may be obtained from the food industry, specifically, from restaurants. In such embodiments that include a filtration step, a filtration cell may be used to remove the impurities produced by the plant-based raw material oil. In some embodiments, the filtration cell may include size 5 micrometer (μm) filter paper or sizes that are less than 5 μm to remove impurities that are larger than 5 μm. During filtration, a constant pressure may be applied to the filtration cell. About 5 psi to about 20 pounds per square inch (psi) may be applied to the filtration cell. In other embodiments, about 5 psi to about 10 psi may be applied to the filtration cell. In other embodiments, other filtration media and adsorbents may be used. The other filtration media and absorbents include any filtration media or absorbents that are capable of removing impurities and excess water from the waste vegetable oil. In some embodiments, a multi-cell filtration apparatus may be used to remove impurities and produce the plant-based raw material oil.

Reference will now be made, in detail, to embodiments of producing a water-based drilling fluid system that includes the synthesized lubricants.

As stated previously, conventional lubricating materials are used in water-based drilling fluid systems to mitigate the COF values of the water-based drilling fluids. However, because of an increasing number of stringent environmental laws and regulations, these materials can only be used in a limited number of applications. This is because conventional lubricating materials, such as diesel or mineral oils and their derivatives, transform an environmentally-friendly water-based fluid into a non-environmentally-friendly drilling fluid system. This may be especially true in extremely sensitive environments, such as offshore and deep-water drilling operations. Hence, there are needs in the industry for an environmentally-friendly lubricant that enhances the lubrication properties of commonly used water-based drilling fluids.

To drill a subterranean well, a drill string, including a drill bit and drill collars to weight the drill bit, is inserted into a predrilled hole and rotated to cause the drill bit to cut into the rock at the bottom of the hole. The drilling operation produces rock fragments. To remove the rock fragments from the bottom of the wellbore, a drilling fluid (or a drilling fluid system) is pumped down through the drill string to the drill bit. The drilling fluid cools the drill bit, provides lubrication, and lifts the rock fragments known as cuttings away from the drill bit. The drilling fluid carries the cuttings upwards as the drilling fluid is re-circulated back to the surface. At the surface, the cuttings are removed from the drilling fluid through a secondary operation, and the drilling fluid may be re-circulated back down the drill string to the bottom of the wellbore for collection of further cuttings. It will be appreciated by one skilled in the art that multiple terms familiar to those skilled in the art may be used to describe the same item. A subterranean well may alternatively be called a well or wellbore. Also, a drilling fluid may alternatively be called a drilling fluid system, particularly when it includes any of the lubricants or additives described subsequently in this disclosure. Usage of a single term is meant to encompass each of the related terms as well.

Drilling fluids include drilling muds, packer fluids, suspension fluids, and completion fluids. Generically, drilling fluids serve a number of functions, with different types specializing in particular functions. In one or more embodiments, the water-based drilling fluid systems suspend the cuttings and weighting materials in the wellbore. Additionally, the oil-based drilling fluid composition may absorb gases in the wellbore, such as carbon dioxide ($CO_2$), hydrogen sulfide ($H_2S$), and methane ($CH_4$), and transport them to the wellbore surface for release, sequestration, or burn-off. The water-based drilling fluid systems may additionally provide buoyancy to the drill string, relieving the tension on the drill string as the length of the wellbore increases. In one or more embodiments, the water-based drilling fluid systems also provide cooling and lubrication functionality for the cooling and lubrication of the bit and drill string utilized in boring operations. In other embodiments, the water-based drilling fluid systems also control subsurface pressures. Specifically, the water-based drilling fluid systems may provide hydrostatic pressure in the wellbore to provide support to the sidewalls of the wellbore and prevent the sidewalls from collapsing and caving in on the drill string. Additionally, the water-based drilling fluid systems may provide hydrostatic pressure in the bore to prevent fluids in the downhole formations from flowing into the wellbore during drilling operations.

As such, embodiments of water-based drilling fluid system, which include the synthesized lubricant, are provided to improve lubrication properties and environmentally-friendly qualities of water-based drilling fluid systems. Specifically, the disclosed water-based drilling fluid systems that include the synthesized lubricant may be formulated to have a reduced COF when compared to water-based drilling fluids without lubricants and water-based drilling fluid systems using conventional lubricants. Additionally, the water-based drilling fluid system that includes the synthesized lubricant is formulated to be environmentally-friendly, unlike water-based drilling fluids with conventional lubricants.

Embodiments of the water-based drilling fluid system include the synthesized lubricant described previously. In some embodiments, the water-based drilling fluid system includes less than 5 weight percent (wt. %) of the synthesized lubricant based on the total weight of the water-based drilling fluid system. In other embodiments, the water-based drilling oil system includes from about 0.5 wt. % to about 5 wt. % of the synthesized lubricant based on the total weight of the water-based drilling fluid system. In further embodiments, the water-based drilling oil system includes about 2 wt. % to about 5 wt. %, about 3 wt. % to about 5 wt. %, about 2 wt. % to about 4 wt. % or about 3 wt. % of the synthesized lubricant based on the total weight of the water-based drilling fluid system.

Additionally, embodiments of the water-based drilling fluid system include a water-based drilling fluid. Embodiments of the water-based drilling fluid may include a non-dispersed drilling fluid, a dispersed drilling fluid, a saltwater drilling fluid, or a polymer drilling fluid. Non-dispersed drilling fluids may include simple gel-and-water drilling fluids, which may typically be used for tophole drilling. A non-dispersed drilling fluid may contain potassium chloride and bentonite. In some embodiments, the water-based drilling fluid may also be a low solid non-dispersion (LSND) drilling fluid. Basic components of a LSND drilling fluid typically include freshwater, a gelling material such as bentonite, caustic soda, soda ash, and flocculants. Dispersed drilling fluids are treated with chemical dispersants that are designed to deflocculate clay particles to allow improved rheology control in muds with greater densities. The water-based drilling fluid may include potassium chloride (KCl), sodium chloride ($CaCl_2$), or combinations thereof.

The water-based drilling fluid includes water. Water may include one or more of fresh water, filtered water, distilled water, sea water, salt water, produced water, formation brine, synthetic brine, or other type of water, or combinations thereof. In one or more embodiments, the water-based drilling fluid includes 70 wt. % to 98 wt. % water based on the total weight of the water-based drilling fluid. In various embodiments, the water-based drilling fluid comprises 70 wt. % to 95 wt. % water, 75 wt. % to 98 wt. % water, 75 wt. % to 95 wt. % water, 80 wt. % to 98 wt. % water, 80 wt. % to 95 wt. % water, 85 wt. % to 98 wt. % water, or 85 wt. % to 95 wt. % water based on the total weight of the water-based drilling fluid.

The water-based drilling fluid system may include at least one solid-phase component. Solid-phase components in the water-based drilling fluid system may include, but are not limited to, the weighting materials, starch, soda ash, bentonite, lime, sodium sulfite, other solid-phase component, or combinations thereof of these solid-phase components. All of the solid-phase components together make up a total solids content of the water-based drilling fluid system. In some embodiments, the water-based drilling fluid system may have a total solids content of less than or equal to 50 wt. % based on the total weight of the water-based drilling fluid composition. Alternatively, in other embodiments, the water-based drilling fluid system may have a solids content of less than or equal to 25 wt. % or less than or equal to 10 wt. % based on the total weight of the water-based drilling fluid system.

The water-based drilling fluid system may optionally include one or a plurality of additives to enhance the properties and characteristics of the water-based drilling fluid system. The additives include, but are not limited to, emulsifiers, fluid-loss control additives, viscosifiers (viscosity control agents), alkali compounds, friction reducers, or combinations thereof. The water-based drilling fluid system may also optionally include pH buffers, electrolytes, glycols, glycerols, dispersion aids, corrosion inhibitors, defoamers, and other additives or combinations thereof. In embodiments, the water-based drilling fluid system may optionally include a viscosifier to impart non-Newtonian fluid rheology to the water-based drilling fluid system to facilitate lifting and conveying rock cuttings to the surface of the wellbore. Viscosifiers may include, but are not limited to, xanthan gum polymer (XC polymer), bentonite, polyacrylamide, polyanionic cellulose, or combinations thereof. In further embodiments, the water-based drilling fluid system may optionally include a friction reducing material, such as a finely ground altered calcium montmorillonite clay, commonly known as "rev dust." In further embodiments, the water-based drilling fluid system may optionally include sodium asphalt sulfonate, commonly known as "soltex." In other embodiments, the water-based drilling fluid system may include 0.5 wt. % to 2 wt. %, 0.5 wt. % to 1.5 wt. %, 0.5 wt. % to 1 wt. %, 1 wt. % to 2 wt. %, 1 wt. % to 1.5 wt. %, or 1.5 wt. % to 2 wt. % of additives.

The water-based drilling fluid system may optionally include at least one pH adjuster. In embodiments, the water-based drilling fluid system may optionally include at least one alkali compound. Alkali compounds may include, but are not limited to, lime (calcium hydroxide or calcium oxide), soda ash (sodium carbonate), sodium hydroxide, potassium hydroxide, other strong base, or combinations thereof of these alkali compounds. The alkali compounds may react with gases, such as $CO_2$ or $H_2S$, encountered by the water-based drilling fluid system during drilling operations to prevent the gases from hydrolyzing components of the water-based drilling fluid composition. In other embodiments, the water-based drilling fluid system may include 0.1 wt. % to 1 wt. %, 0.1 wt. % to 0.8 wt. %, 0.1 wt. % to 0.6 wt. %, 0.1 wt. % to 0.4 wt. %, 0.1 wt. % to 0.2 wt. %, 0.2 wt. % to 1 wt. %, 0.2 wt. % to 0.8 wt. %, 0.2 wt. % to 0.6 wt. %, 0.2 wt. % to 0.4 wt. %, 0.4 wt. % to 1 wt. %, 0.4 wt. % to 0.8 wt. %, 0.4 wt. % to 0.6 wt. %, 0.6 wt. % to 1 wt. %, 0.6 wt. % to 0.8 wt. %, or 0.8 wt. % to 1 wt. % of pH adjusters.

In embodiments, the water-based drilling fluid system that includes the synthesized lubricant may have a pH of from 7 to 12, from 7 to 10.5, from 7 to 10, from 9 to 12, from 9 to 10.5, from 9 to 10, from 9.5 to 12, from 9.5 to 10.5, from 9.5 to 10, from 7.5 to 9, from 7.5 to 9.5, or from 10 to 12. In some embodiments, the water-based drilling fluid system that includes the synthesized lubricant may have a pH of from 9 to 10.5.

In some embodiments, the water-based drilling fluid system that includes the synthesized lubricant may include a weighting material. In some embodiments, the weighting material may be a particulate solid having a specific gravity (SG) sufficient to increase the density of the drilling fluid composition by a certain amount without adding excessive weighting material such that the drilling fluid composition cannot be circulated through the wellbore. The weighting material may have a specific gravity (SG) of from 2 to 6. Weighting materials include, but are not limited to, barite (minimum SG of 4.20), hematite (minimum SG of 5.05), calcium carbonate (minimum SG of 2.7 to 2.8), siderite (minimum SG of 3.8), ilmenite (minimum SG of 4.6), other weighting materials, or any combination of these weighting materials. Embodiments of the water-based drilling fluid system that include the synthesized lubricant may include an amount of weighting material sufficient to increase the density of the drilling fluid system to allow the drilling fluid system to support the wellbore and prevent fluids in downhole formations from flowing into the wellbore. The amount of weighting agent present in the water-based drilling fluid system depends on the required density of the system. The greater the required density of the water-based drilling fluid system, the greater the amount of weighting agent in the system. In other embodiments, the water-based drilling fluid system may include 1 wt. % to 50 wt. %, 1 wt. % to 40 wt. %, 1 wt. % to 30 wt. %, 1 wt. % to 20 wt. %, 1 wt. % to 10 wt. %, 1 wt. % to 5 wt. %, 5 wt. % to 50 wt. %, 5 wt. % to 40 wt. %, 5 wt. % to 30 wt. %, 5 wt. % to 20 wt. %, 5 wt. % to 10 wt. %, 10 wt. % to 50 wt. %, 10 wt. % to 40 wt. %, 10 wt. % to 30 wt. %, 10 wt. % to 20 wt. %, 20 wt. % to 50 wt. %, 20 wt. % to 40 wt. %, 20 wt. % to 30 wt. %, 30 wt. % to 50 wt. %, 30 wt. % to 40 wt. %, or 40 wt. % to 50 wt. % of weighting agents.

The water-based drilling fluid systems that include the synthesized lubricant may be well-suited for use in drilling operations. In embodiments, the water-based drilling fluid systems that include the synthesized lubricant provide lubrication functionality for cooling and lubricating the bit and drill string in boring operations. The synthesized lubricant imparts enhanced lubricity to the water-based drilling fluid system thereby providing increased lubrication and reduced friction between the drill string, pipe, and wellbore during drilling operations. The method for drilling in a well comprises operating a drill in a wellbore in the presence of the water-based drilling fluid system that includes the synthesized lubricant.

Test Methods

The coefficient of friction may be measured in accordance with a standard lubricity coefficient test at room temperature (0° C.) and atmospheric pressure (approximately 14.696 psi). Specifically, a lubricity testing device as commonly used by those in the drilling fluid industry (a lubricity tester from OFI Testing Equipment, Inc. (OFITE), Houston, Tex.) may be utilized. In testing, the lubricant package is positioned between a hardened steel block and rotating ring. A 150 inch-pounds (in-lb) of force is applied between the hardened steel block and rotating ring while the rotating ring spins at 60 rotations per minute (rpm). The 150 in-lb of force is equivalent to 5,000 to 10,000 PSI pressure on the lubricant package. The lubricity testing device then provides a value for the coefficient of friction for the lubricant package based on internal calculations of the lubricity testing device.

EXAMPLES

The following examples illustrate one or more additional features of the present disclosure. It should be understood that these examples are not intended to limit the scope of the disclosure or the appended claims in any manner.

Synthesized Lubricant

To prepare the synthesized lubricant, first, free fatty acids were derived from a waste vegetable oil. The source of waste vegetable oil was vegetable oil that had been used in food preparation (cooking oil) and from restaurants. The waste vegetable oil was a mixture of used vegetable oils, which included, but was not limited to, corn oil, sunflower oil, palm oil, canola oil, and peanut oil.

The food and other impurities present in the waste vegetable oil were then filtered off to produce the plant-based raw material oil. To perform this filtering off step, a filtration cell, which included filter paper and a buckner funnel, was used to remove the impurities including burnt and unburned food residue, which were present in the waste vegetable oil. The filtration cell included size 5 μm filter paper or less to remove impurities that were larger than 5 μm. A constant pressure between about 5 and about 10 psi was maintained on the filtration cell to filter the volume waste vegetable oil.

To treat the free fatty acids, 200 milliliters (mL) of the plant-based raw material oil was placed in a beaker. A magnetic stirring bar was placed inside the beaker, and the beaker was placed on a hot plate stirrer. The magnetic stirring bar of the hot plate stirrer was set at 250 rpm. Then, sodium hydroxide (2 g) was weighed in a small beaker and dissolved in water (20 mL). The prepared 10% sodium hydroxide solution was then added to the beaker containing the plant-based raw material oil under stirring. An immediate change in phase could be observed upon adding sodium hydroxide solution. The hot plate stirrer was then turned on and set at 70° C. The temperature of the reaction mixture was monitored using a thermometer placed inside the beaker. The reaction mixture is allowed to stir for 8 hours at 70° C. and left undisturbed for approximately 16 hours. During this process, the triglyceride was converted to a fatty acid and glycerol, which resulted in a reaction mixture comprising a light brown, semi solid and a brown liquid.

The solids of the reaction mixture were then separated from the liquids of the reaction mixture. The solids were washed with a sodium chloride brine to remove any glycerol present. The collected solids were suspended in water. The suspension had a pH value greater than 10. Hydrochloric acid (31 wt. %) was then added dropwise to the suspension to adjust the pH to a value between 4 and 5. This allowed the sodium salts of free fatty acids to convert back to free fatty acids, which were separated as an oily layer in the top of water phase. The oily phase was then separated from water and collected as a brown liquid. This brown liquid is the synthesized lubricant.

Comparative Lubricant

To compare the rheological properties of drilling fluids containing the synthesized lubricant, a conventional, commercial lubricant was used. The Comparative Lubricant used here (in Comparative Examples A-3, B-3, C-3 and D-3) was Radiagreen EME Salt provided by Bri-Chem Supply, Ltd.

Preparation of Water-Based Drilling Fluid Samples

To compare the lubricating effect of the synthesized lubricant, four water-based drilling fluid formulations were prepared. The four drilling fluids that were chosen are routinely used in the field, namely a $CaCl_2$ drilling fluid (Comparative Example A), a Low Solid Non-Dispersion (LSND) drilling fluid (Comparative Example B), a KCl-polymer drilling fluid (Comparative Example C), and a bentonite drilling fluid (Comparative Example D). The formulation of each example is provided in Table 1. The commercially-available components used were PAC-R (polyanionic cellulose) from Halliburton, Barazan (XC polymer) from Halliburton and Rev Dust from Baker Hughes.

TABLE 1

Formulations of Base Drilling Fluid Examples.

| Component | Comparative Example A: $CaCl_2$ Drilling Fluid | Comparative Example B: LSND Drilling Fluid | Comparative Example C: KCl Polymer Drilling Fluid | Comparative Example D: Bentonite Drilling Fluid |
|---|---|---|---|---|
| Water (mL) | 332 | 332 | 332 | 332 |
| Soda Ash (g) | 0.25 | 0.3 | 0.25 | 0.25 |
| Bentonite (g) | 5 | 6 | 5 | 5 |
| Polyanionic Cellulose (g) | 3 | 3 | 3 | — |
| XC Polymer (g) | 1 | 1 | 1 | — |
| KCl (g) | 20 | 20 | 20 | — |
| Rev Dust (g) | 25 | — | — | — |
| $CaCl_2$ (g) | 20 | — | — | — |
| Sodium asphalt sulfonate (g) | — | 3 | — | — |
| Sodium Sulfite (g) | — | 1 | — | — |
| pH | 9.5 | 9.5 | 9.5 | 9.5 |

Comparison of Lubricious Drilling Fluids

To compare the coefficient of friction of drilling fluids containing the lubricant with those of a drilling fluid containing a conventional, 12 drilling fluid systems were prepared according to the formulations provided in Table 1. Comparative Examples A-1, B-1, C-1, and D-1 were prepared without either lubricant. For Examples A-2, B-2, C-2, and D-2, 1 weight (wt.) % of synthesized lubricant was added to the system based on the total weight of the drilling system. For Comparative Examples A-3, B-3, C-3, and D-3, 3 wt. % of comparative lubricant was added to the system based on the total weight of the drilling system.

The co-efficient of friction (COF) value for each of the 12 drilling fluid systems was measured using an Ofite lubricity meter and using deionized water as a standard. The measured COF values are provided in Table 2. These values were used to compare the effect of the synthesized and comparative lubricants.

TABLE 2

Comparison of Coefficient of Friction Values for Water-Based Drilling Fluid System Examples.

| Example | Base Drilling Fluid | Lubricant | Coefficient of Friction |
|---|---|---|---|
| A-1 (Comparative) | $CaCl_2$ | None | 0.39 |
| A-2 | $CaCl_2$ | Synthesized | 0.21 |
| A-3 (Comparative) | $CaCl_2$ | Comparative | 0.15 |
| B-1 (Comparative) | LSND | None | 0.20 |
| B-2 | LSND | Synthesized | 0.11 |
| B-3 (Comparative) | LSND | Comparative | 0.11 |
| C-1 (Comparative) | KCl | None | 0.37 |
| C-2 | KCl | Synthesized | 0.05 |

TABLE 2-continued

Comparison of Coefficient of Friction Values for Water-Based Drilling Fluid System Examples.

| Example | Base Drilling Fluid | Lubricant | Coefficient of Friction |
|---|---|---|---|
| C-3 (Comparative) | KCl | Comparative | 0.11 |
| D-1 (Comparative) | Bentonite | None | 0.49 |
| D-2 | Bentonite | Synthesized | 0.09 |
| D-3 (Comparative) | Bentonite | Comparative | 0.17 |

As shown in Table 2, compared to a drilling fluid system without lubricant, the drilling fluid systems that include the synthesized lubricant have reduced COF values for each type of drilling fluid system, regardless of the base drilling fluid used. For example, Comparative Example A-1 (no lubricant) has a COF value of 0.39, while Example A-2 (with the synthesized lubricant) has a COF value of 0.21; Comparative B-1 (no lubricant) has a COF value of 0.20, while Example B-2 (with the synthesized lubricant) has a COF value of 0.11; Comparative Example C-1 (no lubricant) has a COF value of 0.37, while Example C-2 (with the synthesized lubricant) has a COF value of 0.05; and Comparative Example D-1 (no lubricant) has a COF value of 0.49, while Example D-2 (with the synthesized lubricant) has a COF value of 0.09. (See Table 2).

In addition, the COF values for the synthesized lubricant were equal to or lesser than the COF values obtained for the comparative lubricant. For example, Comparative Example B-3 (comparative lubricant) has a COF value of 0.11, and Example B-2 (with the synthesized lubricant) has a COF value of 0.11; Comparative Example C-3 (comparative lubricant) had a COF value of 0.11, while Example C-2 (with the synthesized lubricant) has a COF value of 0.05; and Comparative Example D-3 (comparative lubricant) had a COF value of 0.17, while Example D-2 (with the synthesized lubricant) has a COF value of 0.09. (See Table 2).

It should be noted that a lesser amount (1 wt. %) of synthesized lubricant was necessary to achieve these equal to or lesser COF values compared to the comparative lubricant (3 wt. %). Therefore, it is contemplated, that drilling systems with the synthesized lubricant may be more environmentally friendly than drilling fluid systems with the comparative lubricant. For Example A-2 (synthesized lubricant), which had a COF value of 0.21, it is contemplated that increasing the amount of synthesized lubricant in the drilling fluid system may allow drilling fluid systems with $CaCl_2$ and the synthesized lubricant to have equal to or lesser COF values than the comparative lubricant. However, the results indicate that Example A-2 is an environmentally-friendly lubricant that may reduce the COF for water-based drilling fluid systems.

Therefore, based on these results, the synthesized lubricant has the potential to replace the commercial green lubricant.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A method of producing a water-based drilling fluid system comprising:
    treating a plant-based raw material oil with sodium hydroxide to produce a mixture comprising free fatty acids and glycerol;
    treating the mixture with a brine to isolate the glycerol from the mixture comprising free fatty acids and glycerol;
    removing the glycerol to produce a synthesized lubricant comprising free fatty acids, the free fatty acids comprising palmitic acid, oleic acid, and linoleic acid; and
    combining the synthesized lubricant with a base drilling fluid comprising water to produce a water-based drilling fluid system; and
    wherein the water-based drilling fluid system comprises:
        1 wt. % synthesized lubricant based on the total weight of the water-based drilling fluid system;
        4.9 wt. % $CaCl_2$ based on the total weight of the water-based drilling fluid system; and
        wherein the water-based drilling fluid system is homogeneous.

2. The method of claim 1, wherein treating the plant-based raw material oil further comprises heating the plant-based raw material oil and the base at a temperature from about 50° C. to about 75° C.

3. The method of claim 1, wherein the plant-based raw material oil is treated for a period of from about 4 hours to about 8 hours.

4. The method of claim 1, wherein the base drilling fluid additionally comprises a LSND drilling fluid, bentonite, or both.

5. The method of claim 1, wherein the plant-based raw material oil is a waste vegetable oil.

6. The method of claim 1, wherein the base drilling fluid comprises one or more additives chosen from wetting agents, fluid-loss control additives, and weighting additives.

7. The method of claim 1, wherein the water-based drilling fluid system comprises a viscosifier selected from the group consisting of xanthan gum polymer, bentonite, polyacrylamide, polyanionic cellulose, and a combination of two or more of these.

8. The method of claim 1, wherein the free fatty acids further comprise stearic acid, arachidic acid, or both.

9. The method of claim 1, wherein the plant-based raw material oil comprises a vegetable oil.

10. The method of claim 4, wherein the LSND drilling fluid comprises bentonite, caustic soda, soda ash, flocculants, or combinations thererof.

11. A method for drilling a wellbore, the method comprising:
    delivering a homogeneous water-based drilling fluid system to the wellbore, where the water-based drilling fluid system comprises
        1 wt. % synthesized lubricant based on the total weight of the water-based drilling fluid system, the synthesized lubricant comprising free fatty acids comprising palmitic acid, oleic acid, and linoleic acid;
        4.9 wt. % $CaCl_2$) based on the total weight of the water-based drilling fluid system; and
        a base drilling fluid comprising water; and
    wherein the synthesized lubricant was derived from a plant-based raw material oil treated with sodium hydroxide.

12. The method of claim 11, wherein the base drilling fluid additionally comprises a LSND drilling fluid, bentonite, or both.

13. The method of claim 11, wherein the base drilling fluid comprises one or more additives chosen from wetting agents, fluid-loss control additives, and weighting additives.

14. The method of claim 11, wherein the plant-based raw material oil comprises a vegetable oil.

15. The method of claim 11, wherein the plant-based raw material oil is a waste vegetable oil.

16. The method of claim 12, wherein the LSND drilling fluid comprises bentonite, caustic soda, soda ash, flocculants, or combinations thererof.

17. The method of claim 11, wherein the base drilling fluid further comprises one or more additives chosen from wetting agents, fluid-loss control additives, and weighting additives.

18. The method of claim 11, wherein the water-based drilling fluid system comprises a viscosifier selected from the group consisting of xanthan gum polymer, bentonite, polyacrylamide, polyanionic cellulose, and a combination of two or more of these.

19. The method of claim 11, wherein the free fatty acids further comprise stearic acid, arachidic acid, or both.

* * * * *

UNITED STATES PATENT AND TRADEMARK OFFICE
CERTIFICATE OF CORRECTION

| | | |
|---|---|---|
| PATENT NO. | : 11,472,995 B2 | Page 1 of 1 |
| APPLICATION NO. | : 16/037593 | |
| DATED | : October 18, 2022 | |
| INVENTOR(S) | : Ramasamy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Fifth Day of September, 2023

Katherine Kelly Vidal
*Director of the United States Patent and Trademark Office*